United States Patent [19]

Sakai et al.

[11] Patent Number: 4,812,727

[45] Date of Patent: Mar. 14, 1989

[54] STEPPING MOTOR DRIVE DEVICE

[75] Inventors: Shinji Sakai; Takashi Kawabata; Ryosuke Miyamoto, all of Kanagawa, Japan

[73] Assignee: Canon Kabushiki Kaisha, Tokyo, Japan

[21] Appl. No.: 107,877

[22] Filed: Oct. 9, 1987

Related U.S. Application Data

[63] Continuation of Ser. No. 850,975, Apr. 11, 1986, abandoned.

[30] Foreign Application Priority Data

Apr. 16, 1985 [JP] Japan .................. 60-080492

[51] Int. Cl.$^4$ .......................................... H02I 8/00
[52] U.S. Cl. ............................. 318/696; 318/685
[58] Field of Search ....................... 318/696, 685

[56] References Cited

U.S. PATENT DOCUMENTS

| | | | |
|---|---|---|---|
| 4,299,459 | 11/1985 | Mikazami | 354/452 |
| 4,344,678 | 8/1982 | Mikozami | 354/452 |
| 4,471,282 | 9/1984 | Moriguchi | 318/696 |
| 4,476,421 | 10/1984 | Morizuchi | 318/696 |
| 4,495,455 | 1/1985 | Araki | 318/696 |
| 4,529,923 | 7/1985 | Izumi et al. | 318/696 |
| 4,540,927 | 9/1985 | Tamimoto | 318/696 |
| 4,555,653 | 11/1985 | Nawata et al. | 318/696 |
| 4,564,796 | 1/1986 | Yoshimo et al. | 318/696 |
| 4,567,418 | 1/1986 | Takemoto et al. | 318/685 |

*Primary Examiner*—William M. Shoop, Jr.
*Assistant Examiner*—Saul M. Bergmann
*Attorney, Agent, or Firm*—Toren, McGeady & Associates

[57] ABSTRACT

A stepping motor drive device including a comparator for comparing the number of drive steps with a prescribed value and a control circuit for changing the operation of the stepping motor between a 1-2 phase excitation drive mode and a 2-phase excitation drive mode based on the comparison result of the comparator.

23 Claims, 5 Drawing Sheets

STEPPING MOTOR DRIVE DEVICE

This is a continuation of application Ser. No. 850,975 now abandoned, filed Apr. 11, 1986.

BACKGROUND OF THE INVENTION

1. Field of the Invention

This invention relates to a drive device for a stepping motor such as small-sized stepping motor for use in, for example, diaphragm drive, focusing drive, or the like in a camera.

2. Description of the Prior Art

In the conventional device of this kind, means have been provided for preventing the stepping motor from operating out of balance by varying the amount of power to be applied to the stepping motor when it starts to rotate, or stops from rotation, or employing such an acceleration-deceleration pattern that at the time of starting, it varies from a low to a high value, and at the time of stopping, from the high to the low value.

Also, though such an acceleration-deceleration pattern is effective in the case of a larger number of drive steps then the prescribed value, it is not always effective when the number of drive steps is smaller than the prescribed value. In such a latter case, another driving method, for example, 1-2 phase excitation method, which performs the driving at a low speed with a low possibility of occurrence of faulty operation, has often been employed.

However, in the above-described drive method there was a problem that when the number of drive steps is smaller than the prescribed value, a sufficiently high speed driving could not be obtained.

Such a problem has become very serious particularly when the stepping motor is used as the drive means for the diaphragm of the camera, or the focus control of the photographic lens thereof.

SUMMARY OF THE INVENTION

A first object of the invention is to provide a stepping motor drive device which has eliminated the above-described problem.

A second object of the invention is to provide a stepping motor drive device which enables the stepping motor to move always at the fastest speed that varies with the number of drive steps.

Under such objects, according to a preferred embodiment of the invention, a stepping motor drive device is disclosed including comparator means for comparing the number of drive steps with the prescribed value and means for changing over the phase excitation of the stepping motor (between the 1-2 phase excitation mode and 2-phase excitation mode) on the basis of the comparison result of the comparator means.

A further object of the invention is to provide a stepping motor drive device for performing an optimum driving of the stepping motor for the diaphragm of camera, or of the stepping motor for the focus control of the photographic lens.

Further objects of the invention will become apparent from the following description of an embodiment thereof.

DETAILED DESCRIPTION OF THE PREFERRED EMBODIMENTS

In an embodiment of the present invention to be described below, there is disclosed a stepping motor drive device for optimizing the driving of a stepping motor on the basis of the number of drive steps and the drive direction commanded from a control circuit (not shown).

Figure 1:
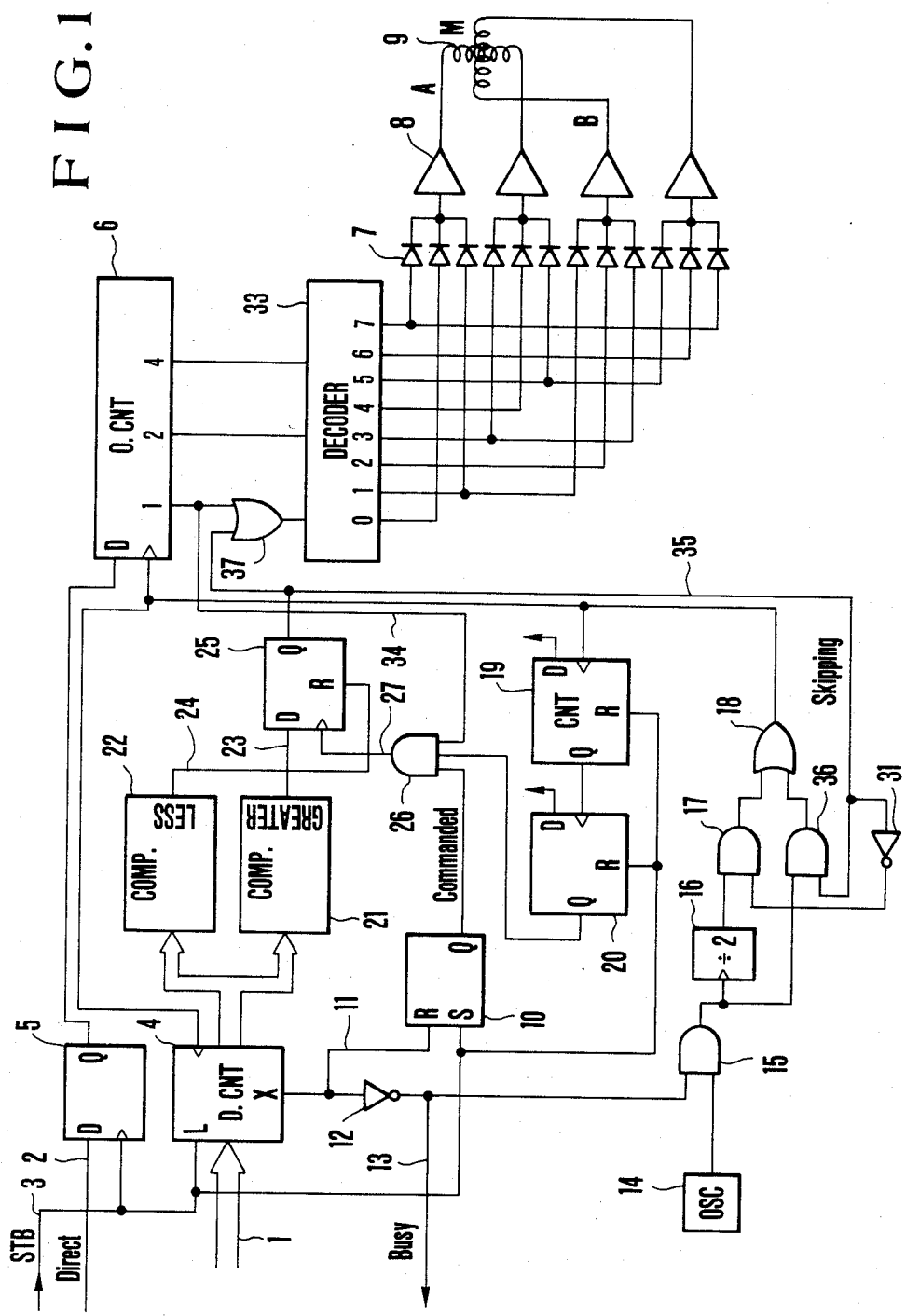
FIG. 1 is a block diagram illustrating the construction of an embodiment of a stepping motor drive device according to the present invention.

FIG. 1 is a block diagram illustrating the construction and arrangement of the elements of a first embodiment of the stepping motor drive device according to the present invention.

In the drive device illustrated in FIG. 1, a signal representing the number of drive steps enters from a line 1 to a DOWN counter 4, and another signal representing the drive direction enters from a line 2 to a D-FF 5. These signals are given to the counter 4 and D-FF 5 in synchronism with a strobe pulse from a line 3. It should be noted that the lines 1, 2 and 3 are supplied with the signals from a control circuit (not shown).

An UP/DOWN counter 6 is used for memorizing and renewing the phase of a stepping motor 9. Its output is applied to a decoder 33, thereby one of the outputs 0 to 7 corresponding to the phase value, is changed to high level. This output is applied through a diode matrix 7 and an amplifier assembly 8 to control driving the 2-phase stepping motor 9.

It should be noted that, as will be seen from the drawing, when one of the odd-numbered outputs of the decoder 33, i.e. the output 1, 3, 5 or 7 of the decoder 33, becomes high, two of the windings of the stepping motor 9 are supplied with current through the respective amplifiers 8. Thus, the 2-phase excitation results. When the output 0, 2, 4 or 6 becomes high, one of the windings of the stepping motor 9 is supplied with current through the amplifier 8. Thus, the 1-phase excitation results.

Here, upon advent of the signals representing the drive amount and the drive direction from the control circuit (not shown) from the lines 1 and 2, and further upon advent of the strobe pulse from the lines 3, the number of drive steps and the drive direction are set in the counter 4 and the D-FF 5, respectively. Also an RS-FF 10 is set by the strobe pulse. By the input from the line 1, the zero output (line 11) of the counter 4 is changed to low. It should be noted that the term "zero output" means that when the counted value of the counter 4 is zero, it takes high level, and when otherwise, it becomes low. Such an output can be formed by an OR gate having inputs connected to the respective outputs of all bits of the counter. Thereby, a Busy line 13 is changed to high through an inverter 12, representing a motor drive-in-progress signal which is applied to the control circuit (not shown). Therefore, the control circuit (not shown) does not produce a new strobe pulse. Such change of the output of the inverter 12 to high level also causes the output of an oscillator 14 to be supplied through an AND gate 15 to a ½ frequency divider 16. Its output pulses are applied through an AND gate 17 and an OR gate 18 to the counter 6. Depending on the direction latched in the D-FF 5, these pulses are counted up or down. Depending on the corresponding output of the decoder 33 to the counted value, the motor 9 is driven with the 1-phase excitation and the 2-phase excitation alternating each other, that is, the 12-2 phase excitation mode is operated. Meanwhile, the counter 4 counts down the outputs of the OR gate 18 from the required number of drive pulses set by the strobe pulse in the line 3. When zero is reached, the line 11 of the zero output is changed to high and, therefore, the line 13 is changed to low. Because this closes the gate 15, the counters 4 and 6 stop from further counting. Therefore, the stepping motor 9 has rotated in the direction required by the signal of the line 2 by the number of steps required by the signal of the line 1 and stops.

In the foregoing embodiment, when the motor 9 is driven by only the method of 1-2 phase excitation, such a control as has been described above takes place. Next explanation is given to another mode of operation of the stepping motor 9 with selection of the 1-2 phase excitation method and the 2-phase excitation method.

In this embodiment, the control to change over the motor 9 that has started to move from the 1-2 phase excitation to the 2-phase excitation is performed when the required driving distance is larger than a prescribed value. That is, at the start of driving, a counter 19 and a D-FF 20 are first reset by the strobe pulse for counting and memorizing the output pulses of the OR gate 18. Concretely speaking, in this embodiment, at a time when the motor 9 has been driven by two pulses from the start of driving, the Q output of the D-FF 20 becomes high. Meanwhile, in this state, an AND gate 26 is supplied with a signal of high level from one of the odd-numbered bits of the counter 6 (that is, the signal respresenting the 2-phase excitation for energization of two of the four windings of the motor 9) through a line 34, another signal of high level from the output Q of the D-FF 20, and the output of the RS-FF 10 that represents the rise of the strobe pulse of the line 3. At a time when these three inputs all take high level, a signal of high level is produced to an output line 27.

Meanwhile, the remaining of the required driving distance by the counter 4 that has started counting down after the start of motor driving is compared by two comparators 21 and 22 with preset values therein. That is, in one comparator 21, when the remaining required drive distance is larger than the preset value therein, it changes its output line 23 to high level. In the other comparator 23, when the remaining required drive distance falls below the preset value therein (which is small than that of the comparator 21), it changes its output line 24 to high level.

Therefore, after the start of driving, when the motor 9 has been driven a number of pulses (in this instance, two pulses), a signal from the AND gate 26 through a line 27 to the clock terminal of a D-FF 25 rises from low to high level. If it is at this time that the output line 23 of the comparator 21 is high, that is, the remaining drive distance is larger than the prescribed value, the D-FF 25 responsive to this input signal of high level changes its Q output (line 35) to high level which is then applied to an OR gate 37. The OR gate 37 changes the LSB of the counter 6, or its odd-numbered bit to high level, thus maintaining the motor 9 to operate with the odd-numbered phase excitation, that is, 2-phase excitation mode.

And, as the 2-phase excitation continues in driving the motor 9, and the down counting of the counter 4 is progressing, at a time when the remaining drive distance becomes smaller than the prescribed value set in the comparator 22, the output of the comparator 22 becomes high, resetting the D-FF 25 through the line 24. Thereby the Q output of the D-FF 25 is turned off, and the signal of high level applied to the OR gate 37 through the line 35 is turned off. As a result, the motor 9 is changed over from the 2-phase excitation drive to the 1-2 phase excitation drive mode. After that, the motor 9 continues being driven by the 1-2 phase excitation until the counter 4 counts zero and the counting by the counter 6 stops.

Also, during the time when the line 35 is of the high level, or when the 2-phase drive mode is forcibly operated, an AND gate 36 opens and via an inverter 31, the AND gate 17 closes, so that the output of the oscillator 14 is passed through the OR gate 18 without any alteration to the counter 6. Thus, a high speed driving results.

In other words, during the time when the line 35 is of high level, the output of the OR gate 37 becomes high level. So, only the outputs 0, 2, 4, 6 of the decoder 33 are changed to high level in sequence one at a time for every two clock pulses applied to the clock signal input terminal of the counter 6, while the outputs 1, 3, 5 and 7 are all left at the low level. Thus, the 2-phase excitation drive mode is operated. Therefore, if the frequency of the clock applied to the counter 6 is constant, it is even when the output of the OR gate 37 is high level that the speed of rotation of the motor 9 is equal to that when in the 1-2 phase excitation drive mode. According to this embodiment, however, when to operate the 2-phase excitation drive mode of the motor 9, the frequency of the clock for application to the counter 6 is increased by a factor of two in response to the signal of the line 35, thereby the speed of rotation of the motor 9 is increased to two times that of the 1-2 phase excitation drive mode. Thus, the driving is performed at a faster speed.

To this end, the oscillator 14, the AND gates 15, 17 and 36, the OR gate 18, the frequency divider 16 and the inverter 31 form a standard signal generating circuit which generates a standard signal having a first generating state when AND gate 17 is open, and a second generating state when AND gate 36 is open.

It should be noted that if the comparator 21 does not give the signal of high level to the D-FF 25 through the line 23 until the AND gate 26 changes its output line 27 to high level after the start of motor driving and at a time when the AND gate 26 produces the output of high level, that is, if it is at this time that the remaining drive amount by the counter 4 is smaller than the prescribed value set in the comparator 21, the Q output of the D-FF 25 does not become high. So, no high signal is applied to the OR gate 37 through the line 35. In this case, therefore, the motor 9 continues to be driven in the 1-2 phase excitation mode until it stops.

In such a manner, according to the embodiment, only when the drive amount (drive pulse number) is larger than the prescribed value set in the comparator 21, it is at the start of driving that the motor is driven in the 1-2 phase mode for a few pulses, then in the intermediate time of driving that the motor is driven in the 2-phase mode with an increased speed, and then at a time just before the stoppage of rotation of the motor that the motor is driven in the 1-2 phase mode, thereby giving an advantage of improving the accuracy of motor control (the 1-2 phase excitation is larger in the effective step number than the 2-phase one).

Next, an example of application of the drive device for the stepping motor of the invention to control the driving of the diaphragm of a camera is described by reference to FIGS. 2 to 5.

Figure 2:
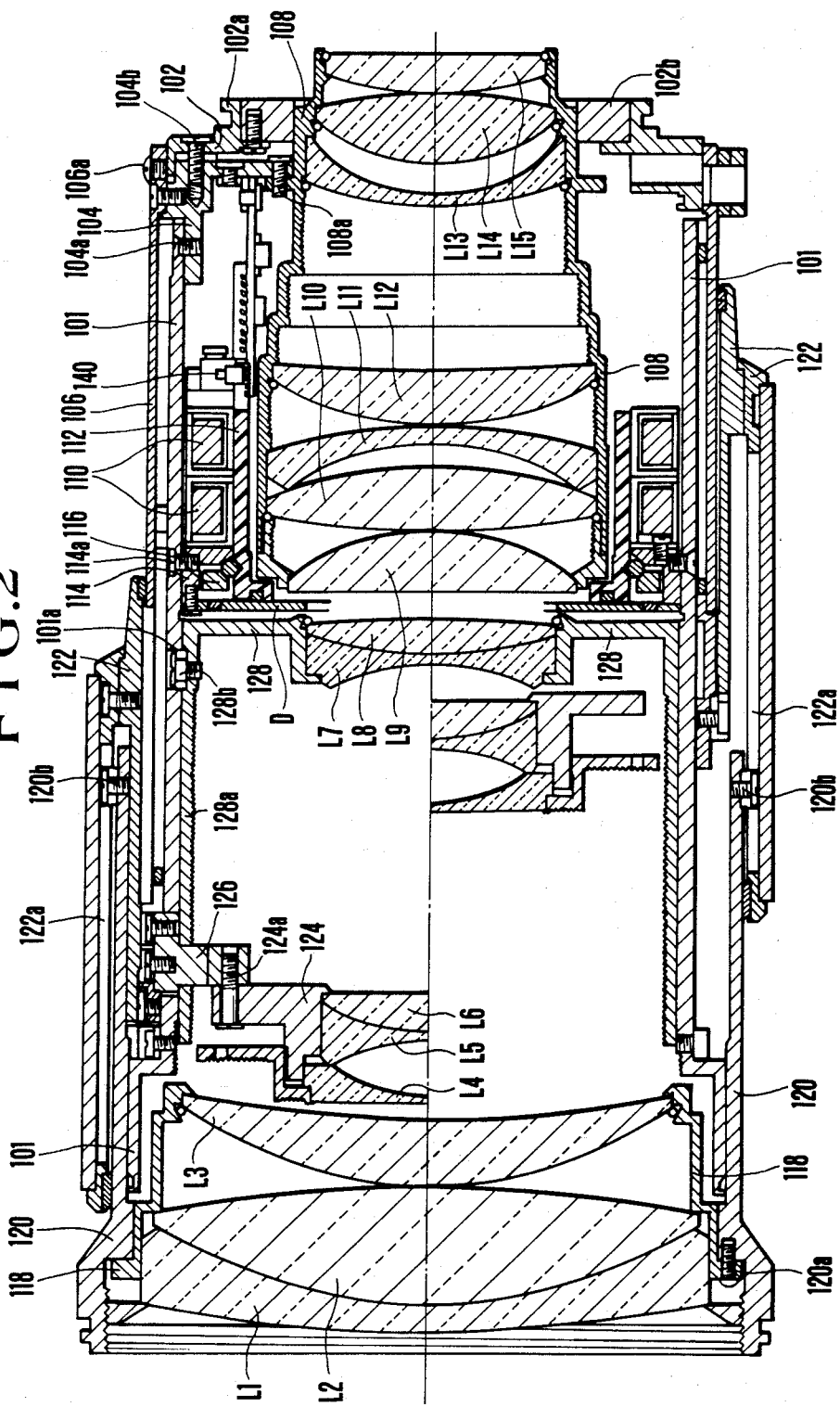
FIG. 2 is a sectional view of a lens mounting to which the stepping motor drive device shown in FIG. 1 is applied.

In FIG. 2, a body tube 101 has a mount member 102 at the rear end thereof to be coupled with a mount member on the camera housing (not shown). The mount member 102 has a bayonet ring 102a and fixedly carries a ring-shaped rear wall 102b of the lens mounting. An interconnector 104 between the tube 101 and the member 102 are fixedly secured thereto by screw fasteners 104a and 104b.

An outer barrel 106 is fixedly secured to the mount member 102 by screw fasteners 106a.

A relay lens system L9-L15 is held in a cell 108 fixedly mounted to the interconnector 104 by screw fasteners 108a.

Figure 3:
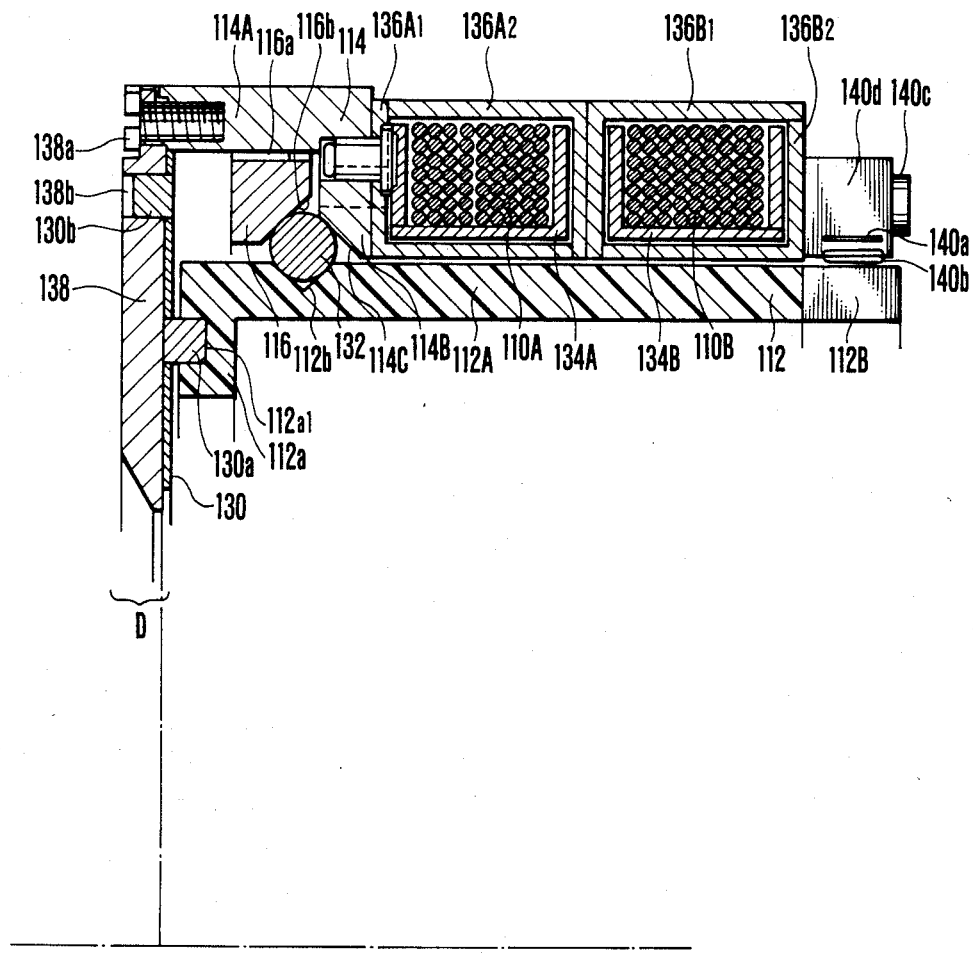
FIG. 3 is a sectional view in enlarged scale of the main parts of the diaphragm unit.

A stepping motor has a stator unit 110 and a rotor unit 112 constituting a drive unit for a diaphragm unit D together with bearing members 114 and 116. The details of this diaphragm drive unit are shown in FIG. 3.

A focusing lens group of members L1 to L3 is held in a cell 118 fixedly secured to a moveable sleeve 120 by screw fasteners 120a.

A variator lens L4-L6 is held in a cell 124 fixedly secured to a movable member 126 by screw fasteners 124a.

A compensator lens L7, L8 is held in a cell 128 whose tubular portion 128a is movably fitted in the inner diameter of the body tube 101 and has a pin 128b fixedly mounted thereon and extending radially outwardly into a guiding slot 101a formed in the body tube 101.

The aforesaid focusing component L1-L3, zoom component L4-L8, and relay compoenent L9-L15 are operated by the mechanism known in Japanese Laid-Open Patent Application No. SHO 56-54408 (U.S. Pat. No. 4,448,496 issued on May 15, 1984).

Figure 4:
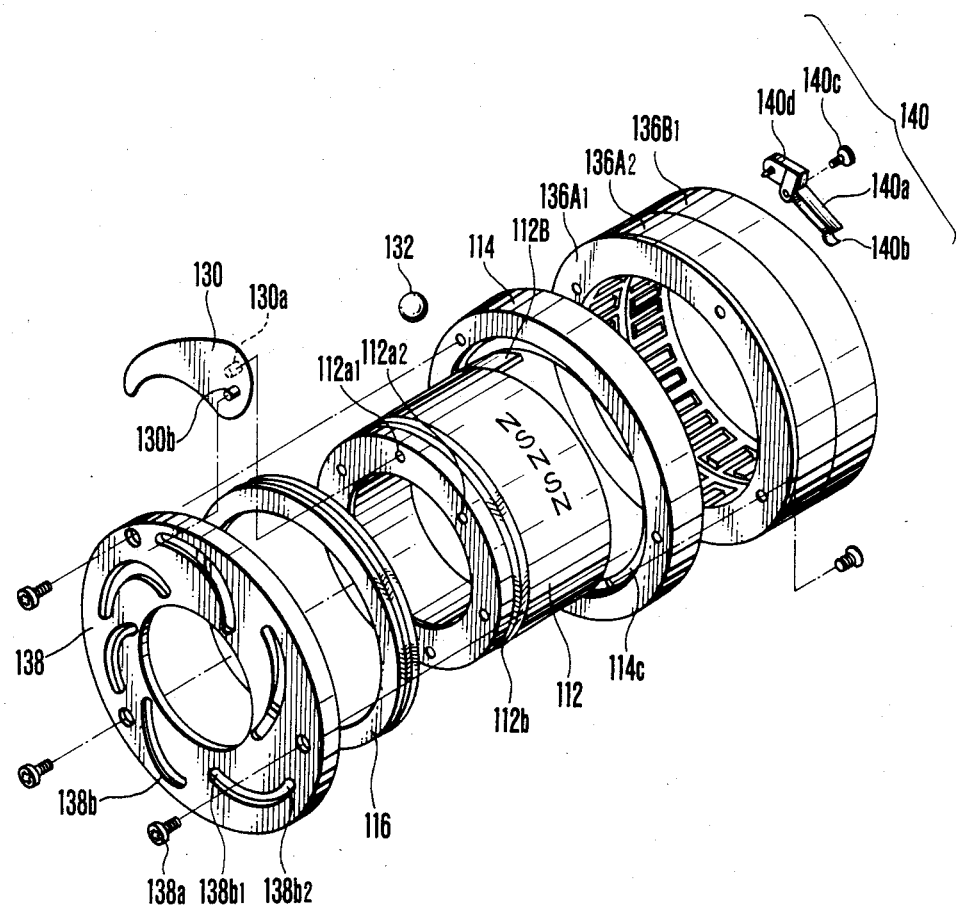
FIG. 4 is an exploded perspective view of the device of FIG. 3.
Figure 5:
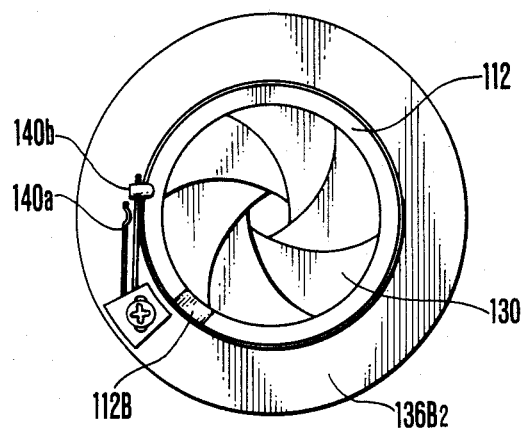
FIGS. 5a and 5b are elevational view of the switch in different operative positions.
Figure 5:
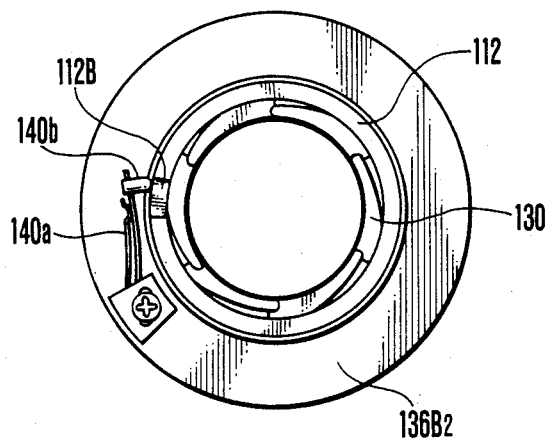

FIGS. 3 and 4 illustrate a diaphragm drive unit of the invention. A rotor 112 of the motor is made of a plastic magnet (Mg) obtained by mixing magnetic substance into synthetic resin material, and is formed to a cylindrical shape for the purpose of facilitating its conformance with the lens cell 108. Where the rotor 112 is magnetized is indicated by 112A. The front end of rotor 112 is provided with a flanged portion 112a. Formed in the front face of the flange 112a are a number of round recesses 112a1, 112a..., 112a in eqully spaced relation to a common circle, in which are movably seated respective control pins 130a for the diaphragm blades 130, the opposite ends of which are fixedly mounted to the rear surfaces of the blades 130. A ball bearing race or recesses 112b to hold ball bearings 132 is or are formed in the outer surface of the front end portion of the cylindrical section 112A.

Exciting coils 110A and 110B are contained in respective bobbins 134A and 134B which are surrounded by pairs of yokes of letter "L" shaped cross section 136A1 and 136A2, and 136B1 and 136B2, respectively. These coils correspond to the four coils shown in FIG. 1. Each of the yokes has a great number of pole teeth longitudinally elongated in conformance with the circumferential surface of the cylindrical section 112A of the rotor 112 and alternating with those of the opposite yoke in each pair.

An outer member for the bearing balls 132 comprises a first ring 114 having a cylindrical portion 114A and a flange portion 114B radially extending inwardly of the rear end of the cylindrical portion 114A, the inner face of the flange portion 114B being inclined to function as an abutment 114C for the ball bearings 132. The first ring 114 is fixedly secured to the body tube 101 by screw fasteners 114A. A second ring 116 as a retainer ring has screw-threads 116a in the outer peripheral surface thereof meshing with screw-threads in the inner surface of the cylindrical portion 114A of the first ring 114. The corner between the inner and rear faces of the second ring 116 is cut off to an inclined face 116b for receiving the balls 132.

Thus, the ball bearings 132 are held between the lower pair of opposedly inclined faces of the race 112b of the rotor 112 and the upper pair of opposedly inclined faces 114C and 116b of the first and second rings 114 and 116.

It is to be noted here that the stator unit of the coils and yokes and the rotor may be exchanged in position with each other.

The diaphragm unit D includes a cam member 138 which is fixedly secured to the front face of the first ring 114 by screw fasteners 138a. This cam member 138 has an equal number, in the instance of FIG. 4, six, of camming slots 138b to the number of the diaphragm blades and is provided with an exposure aperture at the center thereof. Each of the camming slots 138b has one end 138b1 for the minimum size of aperture opening and the other end 138b2 for the maximum one. The diaphragm blades 130 are positioned in a space between the cam disc 138 and the flanged portion 112a of the rotor 112. Cam follower pins 130a and 130b fixedly mounted on the back and front surfaces of the respective blades 130 extend into the camming slots 138b and the recesses 112a1, respectively.

A switch 140 for examining whether or not the diaphragm is at full open aperture is shown in one form of the invention. For this purpose, many forms of the switch can be considered, such that a movable contact and a fixed contact are comprises of a leaf switch, or that a light emitting element, a photosensitive element and a slit member therebetween are comprised of a light operated switch, or that a magnet-resistance element on the rotor 112 and a detector on the body tube 101 are comprised of a so-called MR switch. In the illustrated embodiment of the invention, use is made of the leaf switch with advantages that is can be installed in any spare space though narrow so that a minimization of the size of the lens mounting is facilitated, and that the reliability of detection is highest.

Fixed and movable contacts 140a and 140b respectively are fixedly carried on an electrically nonconductive support 140d fixedly mounted to the yoke 136B2 by a screw fastener 140c. For note, this support 140d may otherwise be mounted to another stationary part of the lens mounting. An actuator for the movable contact 140b is formed to a lobe 112B on the outer surface of the rear end of the rotor 112 and is arranged to lift upward the movable contact 140b until it contacts with the fixed contact 140a when the size of aperture opening of the diaphragm blades 130 takes a maximum value, as shown in FIG. 5b. The thus-closed switch 140 produces an output signal which is useful in determining that the diaphragm is set at full open aperture.

For an exposure value, i.e. shutter time or aperture value, is derived by measuring the brightness of the object with light entering through the photographic lens in the mounting, it is important to ascertain that the diaphragm blades 130 have an aperture opening of the maximum possible size.

With the switch 140 of the invention, when a release button on the camera housing is pushed down, an electrical power supply starts, and an operation of detecting that the switch 140 is closed is initiated. If so, a sequence of light metering—exposure value computing—exposing and so on operations begins.

Since the size of aperture opening defined by the diaphragm blades 130 is controlled in accordance with phase of rotation of the rotor 112 in cooperation with the cam member 138, for, as the rotor 112 is not set in the initial position, the lobe 112B is moved away from the movable contact 140b as shown in FIG. 5a, the thus-opened switch 140 produces no output signal representing the maximum possible size of aperture opening. Responsive to this, a drive control circuit for the exciting coils 110A and 110B allows current to flow in the reversed direction therethrough, thereby the rotor 112 is brought into the intital position where the switch 140 is closed, after the actuation of a camera release and before the initiation of the light metering operation. When such movement of the diaphragm is effected, the driving of the stepping motor is performed as described in FIG. 1.

Though the foregoing embodiments have all been described as constructed with discrete logics, they may be partly or entirely constructed with LSI or soft (program). Particularly, concerning the internal set value of the comparator 22 for changing over from the 2-phase to the 1-2 phase excitation drive mode, it is also possible to do the control by the reading in advance based on the counted value of the counter 6 and the required pulse number, or to delay the changeover timing of the output of the inverter 31 from low to high level to create a short time interval when the 2-phase mode transits to the 1-2 phase mode so that after the vibrations of the 2-phase drive have dumped to almost zero, the 1-2 phase drive of low speed with high accuracy starts. This makes it possible to perform the high speed driving up to the last 0.5 teeth.

As has been described above, according to the invention, the phase excitation method (1-2 phase, 2-phase) is changed over in correspondance to the drive step number, thereby it being made possible to realize an increase in the speed and torque and also an increase in the accuracy when to stop (particularly a small-sized motor). Particularly, in application to the small-sized stepping motor for controlling the driving of the diaphragm or focusing lens of a small instrument such as a camera as has been described by using FIGS. 2 to 5, its driving can be easily controlled.

What is claimed is:

1. A drive apparatus for a stepping motor for a camera system, comprising:
   (a) comparing means for comparing a number of steps to be driven with a prescribed value; and
   (b) switchover means for switching a phase excitation mode of said stepping motor based on the comparison result of said comparing means after starting driving said stepping motor in a 1-2 phase excitation mode;
   wherein said switchover means switches over said stepping motor between a 1-2 phase excitation mode and a 2-phase excitation mode, so that said switchover means switches to the 2-phase excitation mode when the number of steps to be driven is larger than the prescribed value, and maintains the 1-2 phase excitation mode when the number of steps to be driven is smaller than the prescribed value.

2. A drive apparatus of claim 1, wherein said comparing means includes:
   (a) memory means for memorizing the number of steps to be driven; and
   (b) comparing means for comparing the step number memorized in said memory means with the prescribed value.

3. A drive apparatus of claim 2, wherein said memory means is means for memorizing a subtracted value by subtracting the number of steps said stepping motor has been driven from the memorized step number.

4. A drive apparatus of claim 1, wherein said 1-2 phase excitation mode comprises alternating, one to one, 1-phase excitation and a 2-phase excitation when driving said stepping motor, and said 2-phase excitation mode comprises repeating the 2-phase excitation when driving said stepping motor.

5. A drive apparatus according to claim 1, wherein said switchover means is arranged to excite said stepping motor in the 1-2 phase excitation mode at least immediately before said stepping motor stops.

6. A drive apparatus for a stepping motor, comprising:
   (a) comprising a number of steps to be driven with a prescribed value;
   (b) switchover means for switching a phase excitation mode of said stepping motor based on a comparison result of said comparing means; and
   (c) standard signal generating circuit means for producing a standard signal for driving said stepping motor, said generating circuit means controlling a generating state of the standard signal in response to switchover of the phase excitation mode by said switchover means, wherein said standard signal generating circuit means control the generating state of the standard signal by changing a frequency of the standard signal in response to switchover of the phase excitation mode by said switchover means.

7. A drive apparatus of claim 6, wherein said switchover means is switchover means for switching the phase excitation mode of said stepping motor from a 1-2 phase excitation mode to a 2-phase excitation mode.

8. A drive apparatus of claim 7, wherein said standard signal generating circuit means controls the generating state of the standard signal by increasing a frequency of the standard signal in response to switchover of the phase excitation mode from the 1-2 phase excitation mode to the 2-phase excitation mode by said switchover means.

9. A drive apparatus of claim 8, wherein said standard signal generating circuit means increases the frequency of the standard signal by a factor of two in response to switchover of the phase excitation mode from the 1-2 phase excitation mode to the 2-phase excitation mode by said switchover.

10. A device for an image pickup apparatus, comprising:
    (a) a stepping motor for limiting an amount of image information to be picked up by said image pickup apparatus;
    (b) means for commanding a drive step number to said stepping motor;

(c) comparing means for comparing said drive step number with a prescribed value; and (d) switchover means for switching a phase excitation mode of said stepping motor on the basis of a comparison result of said comparing means after starting driving said stepping motor in a 1-2 phase excitation mode;

wherein said switchover means switches said stepping motor between the 1-2 phase excitation mode and a 2-phase excitation mode, so that said switchover means switches over to the 2-phase excitation mode when the number of steps to be driven is larger than the prescribed value, and maintains the 1-2 phase excitation mode when the number of steps to be driven is smaller than the prescribed value.

11. A device of claim 10, wherein said stepping motor is a motor controlling an aperture opening of a diaphragm of said image pickup apparatus.

12. A device of claim 10, wherein said comparing means includes:

(a) memory means for memorizing the number of steps to be driven; and (b) comparing means for comparing the step number memorized in said memory means with the prescribed value.

13. A device of claim 12, wherein said memory means is means for memorizing a subtracted step by subtracting the number of steps said stepping motor has been driven from the memorized step number.

14. A device of claim 10, wherein said 1-2 phase excitation mode comprises alternating, one to one, a 1-phase excitation and a 2-phase excitation when driving said stepping motor, and said 2-phase excitation mode comprises repeating the 2-phase excitation when driving said stepping motor.

15. A drive apparatus according to claim 6, wherein said switchover means is arranged to excite said stepping motor in a predetermined excitation mode at least immediately before said stepping motor stops.

16. A drive appartus according to claim 15, wherein said predetermined excitation mode is the 1-2 phase excitation mode.

17. A drive apparatus according to claim 10, wherein said switchover means is arranged to excite said stepping motor in the 1-2 phase excitation mode at least immediately before said stepping motor stops.

18. A stepping motor controlling apparatus, comprising:

(a) comparing means arranged to generate a predetermined output n in the case where a number of steps to be driven is larger than a prescribed value;

(b) drive means for driving said stepping motor based on an output of said comparing means, said stepping motor having a first phase excitation mode and a second phase excitation mode, said first phase excitation mode having a higher resolution of stop position that that of said second phase excitation mode and said second phase excitation mode having higher velocity than that of said first phase excitation mode; and control means for controlling said drive means, said control means being arranged to control said drive means so that said stepping motor is driven in said first phase excitation mode at the time of starting said stepping motor and said stepping motor is driven in said second phase excitation mode when said predetermined output of said comparing means has been obtained after starting.

19. A stepping motor controlling apparatus according to claim 18, wherein said control means is arranged to control said drive means so that said stepping motor is driven in said first phase excitation mode at least immediately before said stepping motor stops.

20. A stepping motor controlling apparatus according to claim 18, wherein said first phase excitation mode is a 1-2 phase excitation mode.

21. A stepping motor controlling apparatus according to claim 19, wherein said first phase excitation mode is a 1-2 phase excitation mode.

22. A stepping motor controlling apparatus according to claim 20, wherein said second phase excitation mode is a 2-phase excitation mode.

23. A stepping motor controlling apparatus according to claim 21, wherein said second phase excitation mode is a 2-phase excitation mode.

* * * * *